United States Patent Office 3,794,592
Patented Feb. 26, 1974

3,794,592
POLYESTER COMPOSITION HAVING A CONTROL PEAK EXOTHERM WITH ISOCYANATE
Terence E. Winters, Mogadore, and Trent A. Sponseller, Akron, Ohio, assignors to The Goodyear Tire & Rubber Company, Akron, Ohio
No Drawing. Filed Jan. 20, 1972, Ser. No. 219,508
Int. Cl. C08g 22/40, 22/06
U.S Cl. 252—182                                        3 Claims

ABSTRACT OF THE DISCLOSURE

A polyester composition having an exotherm peak with 4,4'-diphenyl methane diisocyanate, 1.5 to about 5 minutes, where the polyester was prepared with a metal esterification catalyst and contains about 5 to 150 parts per million of the metal and about 5 to 150 parts per million of phosphoric acid added to said polyester to control its rate of reaction.

---

This invention relates to a method of making polyesters suitable for use in making polyurethanes. More particularly, this invention relates to a method of making polyesters which have a reduced or controlled rate of reaction with isocyanates.

Polyester polyols that are used in making polyurethanes normally have a relatively low acid number, usually less than 5, and recently it has become desirable to use polyester polyols which have an acid number less than 1 and preferably essentially a half or lower. Polyester polyols having acid numbers less than 1 or those sometimes called zero carboxyls yield polyurethanes which have greatly improved hydrolysis resistance. To produce polyester polyols having the acid numbers enumerated above, from monomeric polyols and polycarboxylic acids, requires an unusually long time unless a catalyst is used.

Therefore, it is desirable to utilize catalysts to speed up the esterification and transesterification reactions hereinafter sometimes referred to as the condensation reactions and to achieve production of the polyester polyols having acid values less than 1 in a reasonable time. Catalysts of the metal type such as titanium, tin, etc. are normally preferred for the condensation reactions and used in about 5 to 200 parts per million with the preferred range being 25 to 150 parts per million.

Unfortunately, the polyester polyols produced utilizing the more effective metal catalysts sometimes tend to react extremely fast with the isocyanates and thus are not as readily utilizable in the normal polyurethane production facilities as polyester polyols produced without the use of such catalysts.

Therefore, an object of this invention is to provide a method of producing polyester polyols utilizing metal catalysts and then controlling the activity of the catalysts to permit the polyester polyol to be utilized in the normal manner in the reaction with isocyanate, and/or later be cured by a crosslinking reaction.

In accordance with the above object, this invention can be practiced by condensing a carboxylic acid or its anhydride with a monomeric polyol in the presence of a metal catalyst to achieve a polyester polyol of the desired molecular weight and hydroxyl and acid numbers. These desired molecular weights usually are about 500 to 10,000 with the more desirable range being 800 to 6000, and the preferred range being 1000 to 4000. When the condensation has proceeded to the point where the desired polyester polyol of the desired acid and hydroxyl number is obtained, about 5 to 500 parts per million of phosphoric acid with the preferred range being 10 to about 100 parts per million is added to the polyester polyol. As a general rule, 10 to 150 parts per million of phosphoric acid is a practical range. This phosphoric acid can be added after the esterification or the condensation reaction has been completed and at about 30° F. to 425° F., so long as it is intimately mixed. The polyester polyol may be maintained at a temperature of 210 to 390° F. for a short time, usually 10 to 50 minutes, to aid mixing in the phosphoric acid. The polyester polyol may be utilized to produce polyurethane by reacting with an organic isocyanate or polyisocyanate in any of the manners known to the polyurethane art, for example, the one-shot, prepolymer and quasi-prepolymer methods.

The nature of this invention may be more readily appreciated and understood by reference to the following illustrative and representative examples wherein the parts are by weight unless otherwise specified.

EXAMPLE I

A polyester reactor vesel equipped with stirrer, purge tube, fractionating column, condenser, vacuum, heaters and feed lines was charged with 464 parts butane diol and 536 parts of adipic acid. Then 135 parts per million of octylene blycol titanate (based on theoretical polyester polyol yield) was added to the reaction vessel and the condensation was carried out by removing sufficient water and glycol overhead under the necessary vacuum to yield a polyester polyol of the desired molecular weight.

To different aliquots of the poly-1,4-butane diol adipate of 1000 molecular weight, prepared above, phosphoric acid as 85.5 percent and 14.5 percent water solution in the amounts shown in Table I was added and held at 230° F. for 30 minutes and then allowed to cool to room temperature before running an exotherm peak temperature determination. The water is preferably removed during this heat treatment to yield an anhydrous polyester. This poly-1,4-butane diol adipate contained 10.8 parts per million of titanium and to each aliquot after the addition of the phosphoric acid was added a measured amount of 4,4'-diphenyl methane diisocyanate (hereinafter sometimes called MDI) as required by the exotherm peak temperature test described hereinafter.

TABLE 1.—DMI EXOTHERM STUDY WITH THE POLYESTER

| Time, minutes | Phosphoric acid treatment—p.p.m. | | | |
|---|---|---|---|---|
| | 5 | 10 | 25 | 70 |
| 0 | 200 | 199.5 | 200.5 | 197 |
| 0.5 | 234 | 201 | 194.5 | 192 |
| 1 | 271.5 | 234 | 203 | 200 |
| 1.5 | [1] 276 | 265 | 211.5 | 209 |
| 2 | 270.5 | [1] 271 | 219.5 | 216 |
| 2.5 | 265.5 | 267 | 226.5 | 222.5 |
| 3 | 260 | 262.5 | 232 | 227 |
| 3.5 | | 258 | 236.5 | 231 |
| 4 | | 254 | 240 | 234 |
| 4.5 | | 250.5 | 241.5 | 236.5 |
| 5 | | | [1] 242.5 | 238 |
| 5.5 | | | 242.5 | [1] 238.5 |
| 6 | | | 241.5 | 238 |
| 6.5 | | | 240.5 | 237 |
| 7 | | | 239.5 | 236 |
| 7.5 | | | | 234.5 |
| 8 | | | | 233.5 |

[1] Exotherm peak; data is in ° F.

It should be noted the sample above treated with 5 p.p.m. of phosphoric acid developed a temperature peak at 276° F. within 1.5 minutes whereas the sample treated with 25 p.p.m. of phosphoric acid developed a temperature peak at 242° F. within 5 minutes. On the other hand, treatment with 70 p.p.m. of phosphoric acid at this titanium level had little additional effect on suppressing the temperature or increasing the time required to reach the peak temperature.

EXAMPLE II

Another batch (25 pounds) of polytetramethylene adipate was made according to the procedure of Example I and upon analysis was found to have a molecular weight of about 1000 and to contain 40 p.p.m. titanium (which was added prior to condensation step as octylene glycol titanate catalyst). Aliquots of this polytetramethylene adipate were treated with varying amounts of 85.5 percent phosphoric acid solution and the exotherm peak temperature determined with MDI. The results of this test are shown in Table 2.

TABLE 2.—MDI EXOTHERM STUDY WITH A POLYESTER

| Time | Phosphoric acid treatment—p.p.m. | | | | | |
|---|---|---|---|---|---|---|
|  | 0 | 40 | 80 | 160 | 320 | 640 |
| 0 | 198 | 197.5 | 197.25 | 198.5 | 198.25 | 198 |
| 0.5 | 285 | 199.5 | 198.5 | 201.5 | 208.5 | 223 |
| 1 | [1] 290 | 209.5 | 209 | 215 | 321 | 255.5 |
| 1.5 | 283 | 218.5 | 218 | 226.5 | 247.5 | 268 |
| 2 | 276 | 225.5 | 225.5 | 236 | 256.5 | [1] 270 |
| 2.5 | 270 | 231 | 231.5 | 242.75 | 260.75 | 269 |
| 3 | 265 | 235.5 | 236 | 246.5 | [1] 261 | 266 |
| 3.5 | 261 | 239 | 239 | 249 | 259.75 | 261.5 |
| 4 | 257 | 241 | 241.5 | [1] 249.5 | 256.5 | 257 |
| 4.5 | 253 | 242 | 242.75 | 248.75 | 253 | 254 |
| 5 |  | [1] 242.25 | [1] 243 | 247.75 | 250 | 252 |
| 5.5 |  | 241.75 | 242.25 | 246.5 | 246.75 | 250 |
| 6 |  | 241 | 241.25 | 245 | 244 |  |
| 6.5 |  | 240 | 239.75 | 241.5 | 241.25 |  |
| 7 |  | 238.5 | 238 | 239.5 |  |  |
| 7.5 |  |  | 236 | 237.5 |  |  |
| 8 |  |  | 234 | 235 |  |  |

[1] Exotherm peak; data is in °F.

NOTE.—It should be noted that the maximum time required to achieve the exotherm peak was achieved at about 40 to 80 p.p.m. phosphoric acid level.

EXAMPLE III

Several batches of polytetramethylene adipate were prepared using the procedure of Example I except various tin catalysts were used instead of titanium catalyst.

These polytetramethylene adipates of about 1000 molecular weight contained 24.8 and 9 p.p.m. tin respectively as dibutyl tin diacetate and 24.8 and 9 p.p.m. tin as stannous chloride dihydrate (both based on the weight of the product polyester) were reacted with MDI and their relative reactivities were measured by recording the exotherms of their exothermic polyester-isocyanate reaction. The results are shown in Tables 3 and 4.

Observation and comparison of the data (specifically exotherm peak times and temperatures) show that there is a slight slowing in the urethane reaction rate as the level of each catalyst is reduced. It is also apparent that, as expected, polyesters catalyzed with 9 p.p.m. of tin as dibutyl tin diacetate react faster than those catalyzed with 9 p.p.m. of tin as stannous chloride dihydrate.

TABLE 3

| Time | 66C. 24.8 p.p.m., Sn, DTD [a] | 68C. 9 p.p.m. Sn, DTD [a] | 52C. 24.8 p.p.m. Sn, SnCl₂ [b] | 48C. 9 p.p.m. Sn, SnCl₂ [b] |
|---|---|---|---|---|
| 0 | 198.25 | 199.25 | 197.75 | 199.5 |
| 0.5 | 290 | 238 | 199.5 | 200.5 |
| 1 | [c] 286 | 279 | 212.5 | 213 |
| 1.5 | 278.5 | [c] 284 | 224 | 225 |
| 2 | 272 | 279 | 234.5 | 234 |
| 2.5 | 267 | 273 | 243.5 | 242 |
| 3 | 261.5 | 268 | 250 | 247.5 |
| 3.5 | 257 | 262 | 253.5 | 251 |
| 4 | 253 | 258.5 | 255.5 | 252.5 |
| 4.5 | 249.5 | 254.5 | [c] 255.5 | [c] 253 |
| 5 | 245.5 | 250.5 | 254 | 252.25 |
| 5.5 |  | 247 | 253 | 250.25 |
| 6 |  |  | 250 | 248.25 |
| 6.5 |  |  | 247.5 | 246 |
| 7 |  |  | 245 | 243.25 |
| 7.5 |  |  |  | 241 |
| 8 |  |  |  | 238.75 |

[a] DTD is dibutyl tin diacetate.
[b] SnCl₂ is stannous chloride dihydrate.
[c] Exotherm peak time and temperature listed below:
66C. peaked at 290.5° F. and ¾ minute.
68C. peaked at 284.5° F. and 1¼ minute.
52C. peaked at 256° F. and 4¼ minute.
48C. peaked at 253° F. and 4½ minute.

TABLE 4.—MDI EXOTHERM STUDY WITH A POLYESTER

| Time | 68C. 9 p.p.m. Sn, DTD [a] | 42C. 3 p.p.m. Ti, OGTi [b] | 48C. 0 p.p.m. Sn, SnCl₂ [c] |
|---|---|---|---|
| 0 | 199.25 | 198.5 | 199.5 |
| 0.5 | 238 | 217 | 200.5 |
| 1 | 279 | 267 | 213 |
| 1.5 | [d] 284 | [d] 288 | 225 |
| 2 | 279 | 283.5 | 234 |
| 2.5 | 273 | 277 | 242 |
| 3 | 268 | 271.5 | 247.5 |
| 3.5 | 262 | 265 | 251 |
| 4 | 258.5 | 260 | 252.2 |
| 4.5 | 254.5 | 255.5 | [d] 253 |
| 5 | 250.5 | 251.5 | 252.25 |
| 5.5 | 247 |  | 250.25 |
| 6 |  |  | 248.25 |

[a] DTD stands for dibutyl tin diacetate catalyst.
[b] OGTi stands for actylene glycol titanate catalyst.
[c] SnCl₂ stands for stannous chloride dihydrate catalyst.
[d] Exotherm peak time and temperature listed below:
68C. peaked at 284.5° F. and 1½ minutes.
42C. peaked at 288° F. and 1½ minutes.
48C. peaked at 253° F. and 4½ minutes.

The exotherm peak temperature tests were run as follows: 50 g. of molten polyester was added to a 4-oz. bottle and placed in an oil bath. The motor driven stirrer was inserted into the bottle, as low as possible to provide adequate stirring. The temperature probe was placed in the polymer and allowed to heat to bath temperature (93° C.). A slow nitrogen purge was passed over the liquid in the bottle.

While the polyester is heating weigh out the proper amount of diisocyanate (MDI) to give 4 percent by weight of excess NCO in the prepolymer based on the equivalent weight of the polyester.

Add the diisocyanate to the polyester as quickly as possible noting initial time and temperature. Care must be taken not to keep the diisocyanate molten for more than an hour. It will decompose with prolonged heating. Take a reading at the minimum temperature and readings at 30 second intervals from the addition of diisocyanate to about three minutes after the temperature peaks. A plot of the temperature versus time indicates the peak exotherm temperature.

Although the exemplification of this invention has been set forth in particular detail with regard to adipate polyester, it can be used equally well in the preparation of other polyesters with the esterification and condensation catalyst for polyester preparation.

Representative of the many monomeric polyols and polycarboxylic acids are the aliphatic, cycloalphatic and aromatic polyols having 2 to 5 hydroxyls and the polycarboxylic acids of the aliphatic, cycloaliphatic and aromatic class having 2 to 3 or more carboxylic groups, which can be used in Example I to make the polyester.

Representative members of the polyols are the glycols of 2 to 20 carbon atoms, typified by ethylene glycol, propylene glycol, butylene glycol, decamethylene glycol or xylene glycol, the triols of 3 to 20 carbon atoms, typified by glycerol, hexanetriol, trimethylol propane, trimethylol ethane.

Representative of the aliphatic polycarboxylic acids are the aliphatic dicarboxylic acids of 2 to 20 carbon atoms typified by adipic, azelaic, maleic acids, and the aromatic acids such as phthalic, isophthalic and terephthalic acids and anhydrides of these acids.

Although the examples have used the polyester of butane diol, ethylene glycol, propylene glycol, amylene glycol and their mixture or others could just as readily have been used in Example I and the following examples to illustrate the use of phosphoric acid to control or suppress the metal catalyst activity. Likewise, instead of using adipic acid in Example I, etc. to make the polyester, other acids such as azelaic, the phthalic, suberic, succinic, sebacic and related saturated acids of 4 to 10 carbon atoms could have been used as well as the others.

Heretofore in this specification, reference has been made to phosphoric acid as denoting the usual 85% aqueous or anhydrous acid, which are both readily available commerically. However, it should be noted that the phosphoric acid effective in this invention can also be generated in situ from suitable precursors which yield phosphoric acid, for example, from thermal or chemical degradation of other phosphorus compounds.

While certain representative embodiments and details have been shown for the purpose of illustrating the invention, it will be apparent to those skilled in this art that various changes and modifications may be made therein without departing from the spirit of scope of the invention.

What is claimed is:

1. A polyester composition having an exotherm peak with 4,4'-diphenyl methane diisocyanate of 1.5 to about 5 minutes comprising a polyester prepared with a metal esterification catalyst selected from the class of tin and titanium by the condensation of a polyol containing 2 to 5 hydroxyls and about 2 to 20 carbon atoms with a polycarboxylic acid containing 2 to 3 carboxylic groups and 2 to 20 carbon atoms or its anhydride and containing about 5 to 150 parts per million of the metal and 5 to 150 parts per million of phosphoric acid.

2. The polyester composition of claim 1 wherein the polyol is selected from the class of ethylene glycol, propylene glycol, butane diol, amylene glycol and their mixtures.

3. The polyester composition of claim 1 wherein the carboxylic acid is selected from the class of adipic, azelaic, suberic and the phthalic acids.

References Cited
UNITED STATES PATENTS

| | | | |
|---|---|---|---|
| 3,257,337 | 6/1966 | Schoepfle et al. | 260—75 P |
| 3,635,904 | 1/1972 | Briggs et al. | 260—75 NE |

OTHER REFERENCES

Chemical Abstracts, American Chemical Soc., vol. 74, 1971, 3987r.

CARL D. QUARFORTH, Primary Examiner

I. GLUCK, Assistant Examiner

U.S. Cl. X.R.

260—2.5 AB, 2.5 AR, 75 NN, 75 NE, 75 NB, 75 P

PO-1050
(5/69)

UNITED STATES PATENT OFFICE
CERTIFICATE OF CORRECTION

Patent No. 3,794,592          Dated February 26, 1974

Inventor(s) Terence E. Winters and Trent A. Sponseller

It is certified that error appears in the above-identified patent and that said Letters Patent are hereby corrected as shown below:

Column 2, line 21, change the spelling of "blycol" to -- glycol --;
    Column 2, Table 1, in the title, change "DMI" to -- MDI --;
    Column 3, Table 2, third line under the heading "320" change "321" to -- 231 --;
    Column 4, Table 4, second line of the last heading, change "0 p.p.m. Sn." to -- 9 p.p.m. Sn. --.

Signed and sealed this 1st day of October 1974.

(SEAL)
Attest:

McCOY M. GIBSON JR.                C. MARSHALL DANN
Attesting Officer                 Commissioner of Patents